(12) United States Patent
Dias

(10) Patent No.: US 10,594,212 B2
(45) Date of Patent: Mar. 17, 2020

(54) PFM EFFICIENCY OPTIMIZER FOR FAST LOAD TRANSIENT RESPONSE

(71) Applicant: Dialog Semiconductor (UK) Limited, London (GB)

(72) Inventor: Nuno Miguel Nogueira Dias, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/605,997

(22) Filed: May 26, 2017

(65) Prior Publication Data

US 2018/0342951 A1 Nov. 29, 2018

(51) Int. Cl.
| | |
|---|---|
| *H02M 3/156* | (2006.01) |
| *H02M 3/157* | (2006.01) |
| *H02M 3/158* | (2006.01) |
| *H02M 1/14* | (2006.01) |

(52) U.S. Cl.
CPC .............. *H02M 3/156* (2013.01); *H02M 1/14* (2013.01); *H02M 3/157* (2013.01); *H02M 3/158* (2013.01); *H02M 3/1582* (2013.01); *H02M 2003/1566* (2013.01)

(58) Field of Classification Search
CPC ........ H02M 1/14; H02M 3/157; H02M 3/156; H02M 2003/1566
USPC .......................................... 323/270, 282–288
See application file for complete search history.

(56) References Cited

U.S. PATENT DOCUMENTS

| | | | | |
|---|---|---|---|---|
| 5,627,460 | A * | 5/1997 | Bazinet | G05F 1/618 323/224 |
| 6,597,157 | B1 * | 7/2003 | Boeckmann | G05F 1/618 323/242 |
| 6,970,339 | B2 * | 11/2005 | Wong | H02M 3/1588 361/93.1 |
| 7,030,596 | B1 * | 4/2006 | Salerno | H02M 3/158 323/282 |
| 7,102,339 | B1 | 9/2006 | Ferguson | |
| 7,598,715 | B1 * | 10/2009 | Hariman | H02M 3/1588 323/222 |
| 2003/0231010 | A1 * | 12/2003 | Sase | H02M 3/1584 323/282 |
| 2007/0210772 | A1 | 9/2007 | Sawtell | |
| 2007/0236197 | A1 | 10/2007 | Vo | |
| 2010/0007999 | A1 * | 1/2010 | Iwata | H02M 3/158 361/18 |
| 2010/0188061 | A1 * | 7/2010 | Ma | H02M 3/158 323/247 |

(Continued)

*Primary Examiner* — Nguyen Tran
*Assistant Examiner* — David A. Singh
(74) *Attorney, Agent, or Firm* — Saile Ackerman LLC; Stephen B. Ackerman

(57) ABSTRACT

A method for pulse-frequency modulation efficiency optimization, for fast load transient response, in a DC-DC switching converter, is disclosed. The method provides for dynamic blanking, of the under voltage comparator, while maintaining the maximum switching frequency in pulse-frequency mode. The optimization becomes more relevant with the reduction of the regulated output voltage. A further object of the disclosure is to increase the power conversion efficiency of pulse-frequency mode (PFM) by increasing the Load Bursting Point (LBP), maintaining compatibility with the fast load transient response of current DC-DC switching converter architectures.

20 Claims, 10 Drawing Sheets

(56) References Cited

U.S. PATENT DOCUMENTS

| | | | | |
|---|---|---|---|---|
| 2013/0021009 A1* | 1/2013 | Waltman | ............... | H02M 3/156 323/271 |
| 2015/0326123 A1* | 11/2015 | Fukushima | ........... | H02M 3/158 323/271 |
| 2018/0048232 A1* | 2/2018 | Adell | .................... | H02M 3/157 |

* cited by examiner

PFM EFFICIENCY OPTIMIZER FOR FAST LOAD TRANSIENT RESPONSE

BACKGROUND

Field

The disclosure relates generally to Buck, Boost, Buck-Boost and other types of DC-DC switching power converters, and fast load transient response times.

Description of Related Art

When a DC-DC switching converter operates in pure pulse-frequency mode (PFM) mode, the power conversion efficiency is improved, since the main power losses caused by switching and conduction are scaled proportionally to the load current. As the load increases, the PFM switching frequency also increases, in order to maintain the regulation, and to decrease the switching converter output voltage ripple. At a given load bursting point (LBP) sustained in PFM mode, the delay of the output voltage drop detection circuit allows for sufficient output capacitor charge loss, such that the voltage drop cannot be recovered within the time the inductor current reaches the PFM peak. This causes the switching converter control logic to drive the inductor in burst mode, which is less efficient. The efficiency loss is especially notable when regulating at low output voltages, which is the current tendency of the technology.

FIG. 1 conceptually explains efficiency loss 100, for a DC-DC switching converter known to the inventor, operating in burst mode. The charge that is possible to be delivered in a single pulse Qnb, where nb denotes not bursting, is much higher than that of the second pulse of the burst Qb, while the burst pulse has nearly the same switching losses. Furthermore the output voltage Vout ripple is increased when bursting, when compared to refSlp, the PFM voltage reference. The charge Qnb would be sufficient to bring Vout back into regulation, which makes the cycle delivering Qb unnecessary over a higher load range.

VoutOkSlp is defined as the output of the under voltage comparator, or output voltage drop detection circuit. VoutOkSlp is reset for a period of time TrstSlp, where TrstSlp is defined as the duration of the high state of rstSlp. RstSlp is defined as the blanking of the under voltage comparator.

TslpMinOff is defined as the minimum time allowed between the peak of the inductor load current and the beginning of the next switching cycle. The duration of the high state TrstSlp<TslpMinOff the time between the peak and the next cycle.

TdCmpnb is defined as the under voltage comparator delay time when not bursting, and TdCmpb is defined as the under voltage comparator delay time when bursting. The delay when bursting TdCmpb<TdCmpnb the delay when not bursting.

ThiZnb is defined as the high output impedance state duration when not bursting, and ThiZb is defined as the high output impedance state duration when bursting. The duration when not bursting ThiZnb<ThiZb the duration when bursting.

In FIG. 1, it is shown that efficiency optimization of the switching converter may be achieved by blanking the under voltage comparator output, when rstSlp is high, for a given fixed delay after the first current limit peak is achieved. While this is desirable for efficiency, it is a major drawback for fast load transient response, given the control is unable to ramp up inductor load current, ILx, during the blanking.

Furthermore, in multiphase DC-DC switching converter topologies, the asynchronous rstSlp generated by one phase, delays the turn on of another phase, since the common under voltage comparator may reset by one phase when another phase could turn on. This potentially degrades the worst case transient response of the switching converter.

FIG. 2 presents silicon evaluation results 200, of the static efficiency of a DC-DC switching converter known to the inventor. The static efficiency drop caused by bursting in PFM, at load current iLoad~400 mA, increases with a decrease in the output voltage. This is shown for output voltage Vout=0.65V in signal waveform 210. At a given load bursting point sustained in PFM mode, the delay of the under voltage comparator allows for sufficient capacitor charge loss, such that the voltage drop cannot be recovered within the time the inductor load current reaches peak PFM.

SUMMARY

An object of the disclosure is to provide pulse-frequency modulation efficiency optimization for fast load transient response in a current-control mode DC-DC switching converter.

A further object of the disclosure is to provide dynamic control of the reset duration of the output voltage drop detection circuit, under voltage comparator, of the DC-DC switching converter.

Still, further an object of the disclosure is to increase the power conversion efficiency of pulse-frequency mode (PFM) by increasing the Load Bursting Point (LBP), maintaining compatibility with the fast load transient response of DC-DC switching converter architectures.

To accomplish the above and other objects, a current-control mode DC-DC switching converter is disclosed, comprising an under voltage comparator, configured to detect an output voltage drop. The DC-DC switching converter further comprises a modulator and logic circuit, configured to indicate a load is above a defined high point, and configured to bring an inductor current back into regulation. The DC-DC switching converter still further comprises a delay generator, configured to provide a dynamic reset time, a high side device and driver, and a low side device and driver.

The above and other objects are further achieved by a method for pulse-frequency modulation efficiency optimization, for fast load transient response, in a current-control mode DC-DC switching converter. The steps include providing an under voltage comparator, to detect an output voltage drop. The steps also include providing a modulator and logic circuit, to indicate a load is above a defined high point, and to bring an inductor current back into regulation. The steps include providing a delay generator, for a dynamic reset time of the under voltage comparator. The steps also include increasing power conversion efficiency, for both single phase and multi-phase operation.

In various embodiments the function may be achieved using a Buck, Boost, or Buck-Boost DC-DC switching converter.

In various embodiments the function may be achieved using a PMOS high side device.

In various embodiments the function may be achieved using a NMOS low side device.

In various embodiments, the function may be achieved with a multiphase DC-DC switching converter.

DETAILED DESCRIPTION

The maximum switching frequency in pulse-frequency sleep mode (PFM), in a DC-DC switching converter known to the inventor, is limited by the minimum time allowed between the peak of the inductor current and the beginning of the next switching cycle, TslpMinOff. After the duration of the high state expires in TrstSlp, the under voltage comparator checks if a PFM pulse is needed, VoutNoPnc, and if the switching converter has dropped below the reference voltage to regulate, refSlp.

The present disclosure allows extending the duration of TrstSlp at lower loads, without increasing the TslpMinOff. If the applied load goes beyond sleep mode capability, triggering a panic condition with output voltage drop, the switching converter moves to dynamic PFM, and TrstSlp is significantly reduced. This allows for fast reaction time, minimizing the interaction between phases through the comparator reset logic. Longer blanking times allow for higher LBP, and therefore higher PFM load range, to improve efficiency in the switching converter design.

Figure 3:
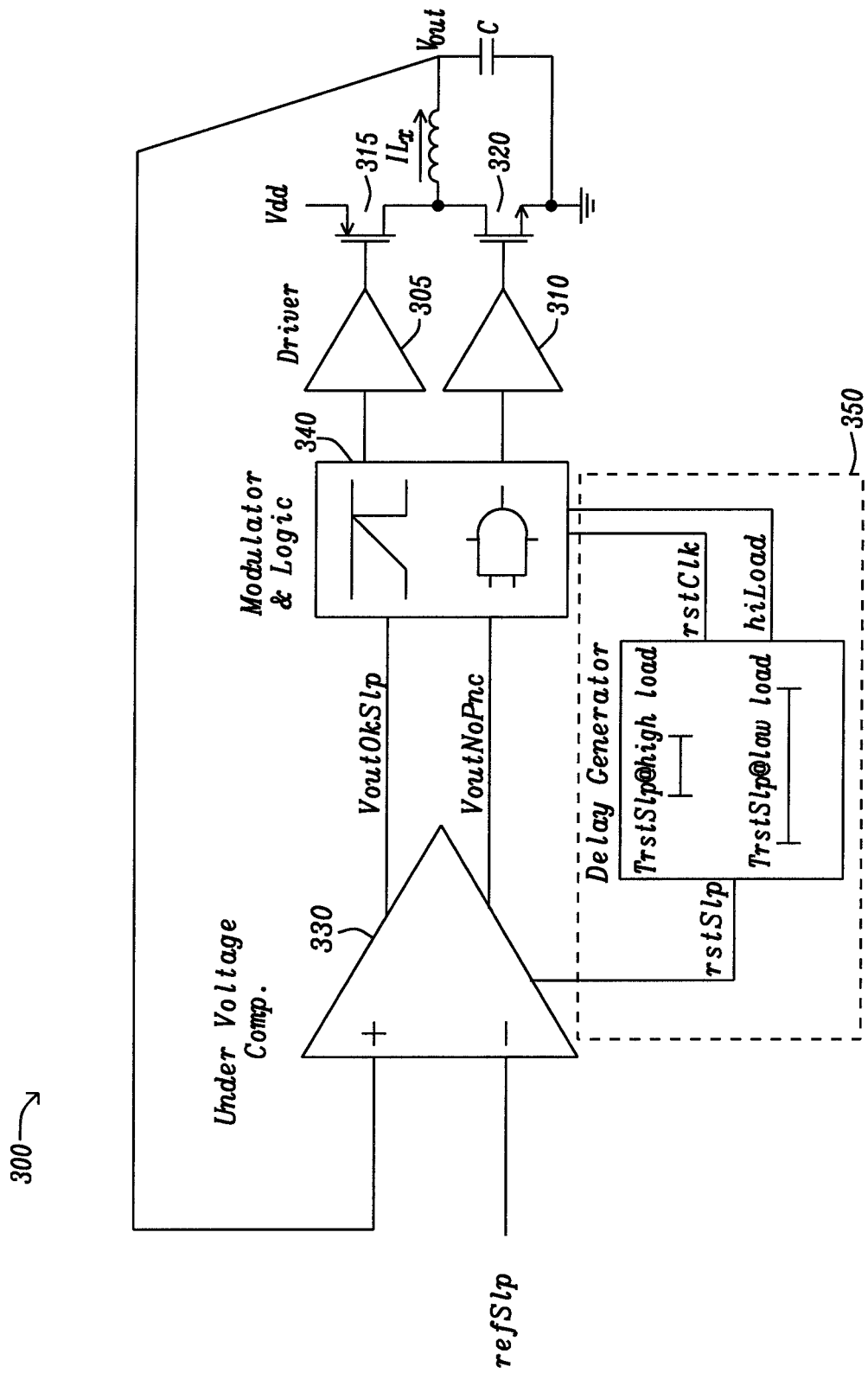
FIG. 3 presents a block diagram of a switching converter, with a dynamic reset time loop, embodying the principles of the disclosure.

FIG. 3 presents block diagram of switching converter 300, with a dynamic reset time loop, embodying the principles of the disclosure. Here dynamic reset rstSlp is determined by delay generator 350 and is used to control under voltage comparator 330. The under voltage comparator receives output voltage Vout, determined by inductor load current ILx across capacitor C on the non-inverting input, and reference voltage refSlp on the inverting input. The under voltage comparator outputs VoutOkSlp, when a PFM pulse is needed in sleep mode, and VoutNoPnc, if the switching converter has dropped below the reference voltage. VoutOkSlp and VoutNoPnc are inputs to Modulator & Logic 340, where the modulator logic provides control signals to high side device 315 through driver 305, and low side device 320 through driver 310.

Delay generator input signals from the modulator logic are rstClk to reset the clock, and hiLoad to indicate a load is beyond a defined point high. The delay generator supplies dynamic reset rstSlp to the under voltage comparator, where TrstSlp is defined as the duration of the high state of rstSlp, and the time of the blanking of the under voltage comparator. TrstSlp@hiLoad signals to blank the under voltage comparator for high loads, and TrstSlp@loLoad signals to blank the under voltage comparator for low loads.

For the circuit of FIG. 3, the amount of delay introduced by the delay generator is dependent on the loading conditions. The reset time does not extend the off time of the high side device, when switching in PFM continuous conduction mode (CCM), therefore the maximum switching frequency is not decreased. The logic of the disclosure delays the latching of the decision when switching is needed in low power mode, avoiding unnecessary pulses and increasing the power conversion efficiency, and reduces the reset time at higher loads to allow for fast dynamic response time.

Figure 4:
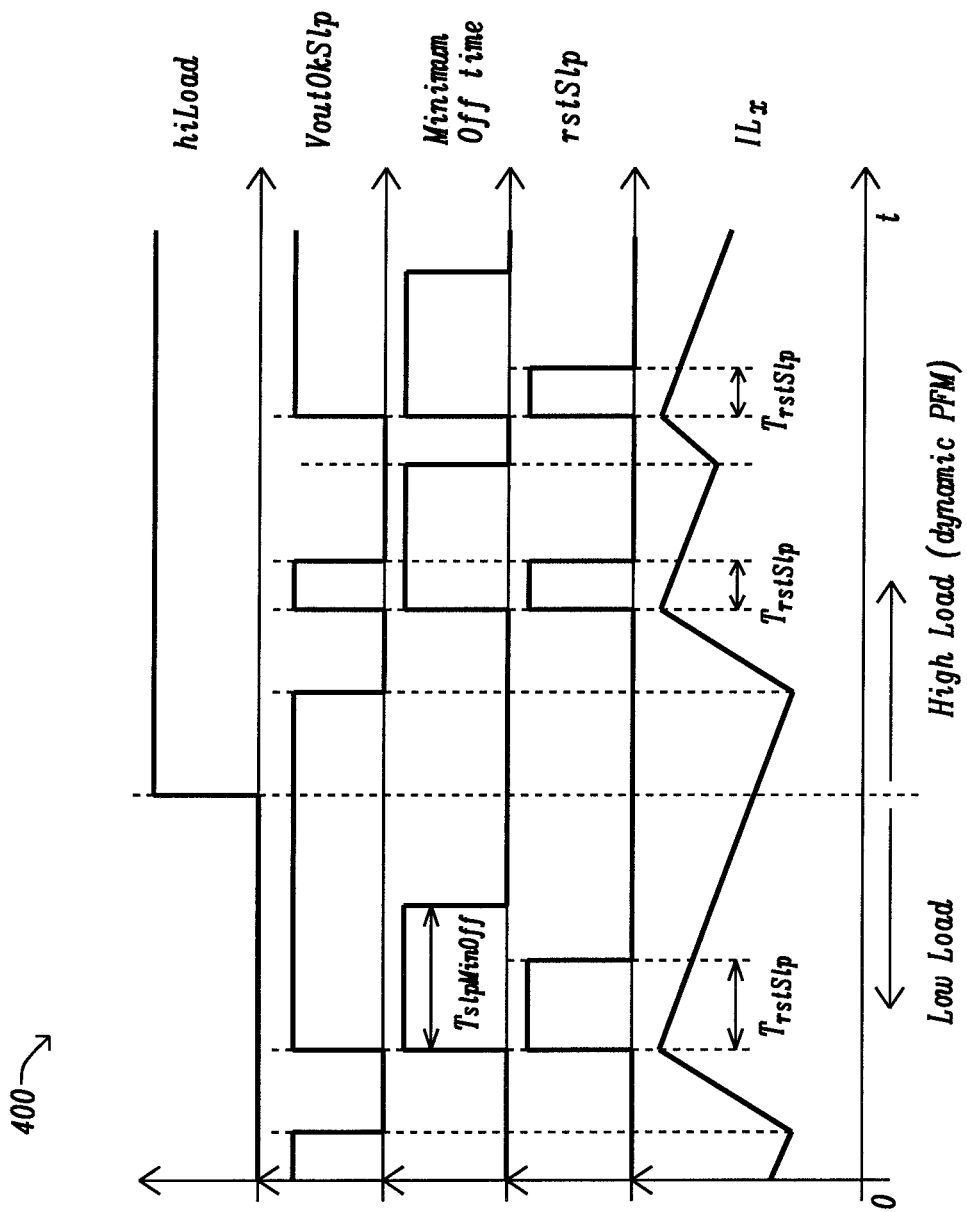
FIG. 4 presents a waveform diagram of the dynamic reset duration of the under voltage comparator of FIG. 3.

FIG. 4 presents 400, the waveform diagram for the dynamic reset duration of the under voltage comparator of FIG. 3. At each rstClk edge a rstSlp is generated with the duration defined by hiLoad: TrstSlp@hiLoad Hi<TrstSlp@hiLoad Lo. HiLoad flags a threshold when the load goes beyond a defined point, increasing beyond the PFM capability of the switching converter, when instead dynamic PFM is required to sustain the load.

In FIG. 4 is shown that for low loads, the duration of the under voltage comparator output blanking signal TrstSlp is extended, without increasing the minimum time allowed between peak inductor current and the beginning of the next switching cycle TslpMinOff. If the applied load goes beyond sleep mode capability in high loads, the switching converter moves to dynamic PFM, and TrstSlp is significantly reduced.

The output of the under voltage comparator VoutOkSlp indicates when a PFM pulse is needed in sleep mode. The modulation logic and delay generator operate to bring the inductor load current, ILx, back into regulation. This results in improvement of the fast load transient response of the switching converter.

Figure 1:
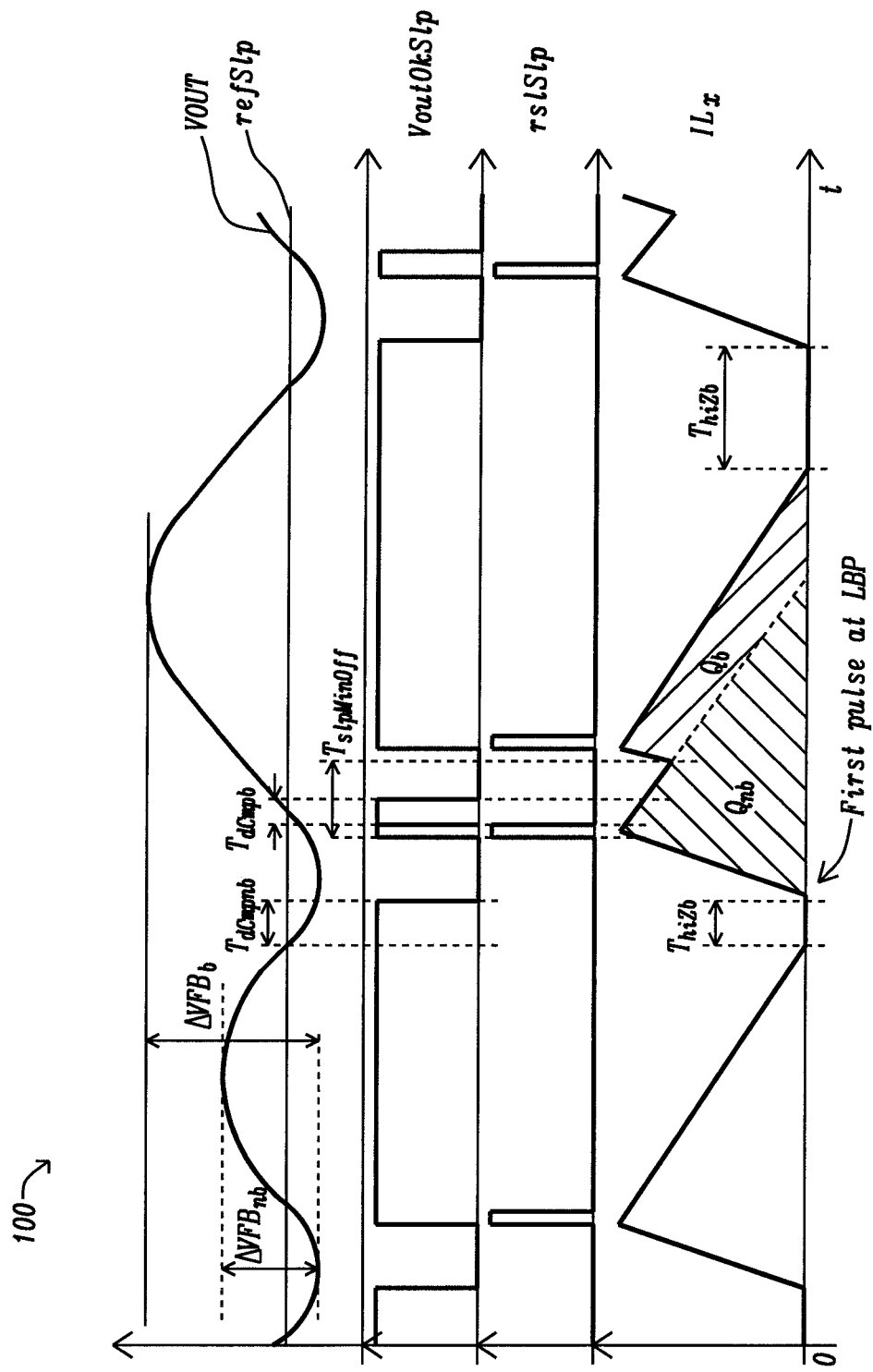
FIG. 1 conceptually explains the efficiency loss, for a DC-DC switching converter known to the inventor, operating in burst mode.
Figure 2:
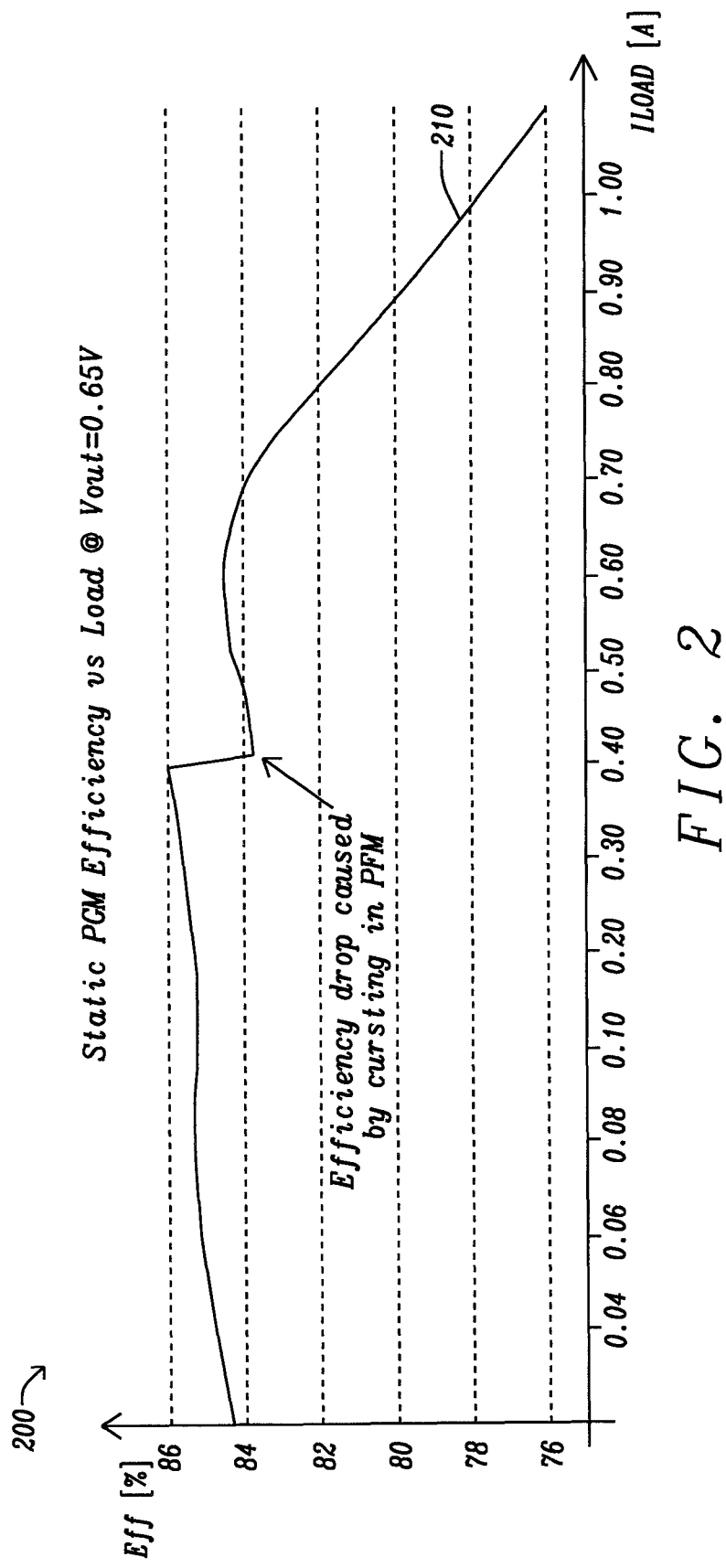
FIG. 2 presents the silicon evaluation results of static efficiency of a DC-DC switching converter, known to the inventor.
Figure 5:
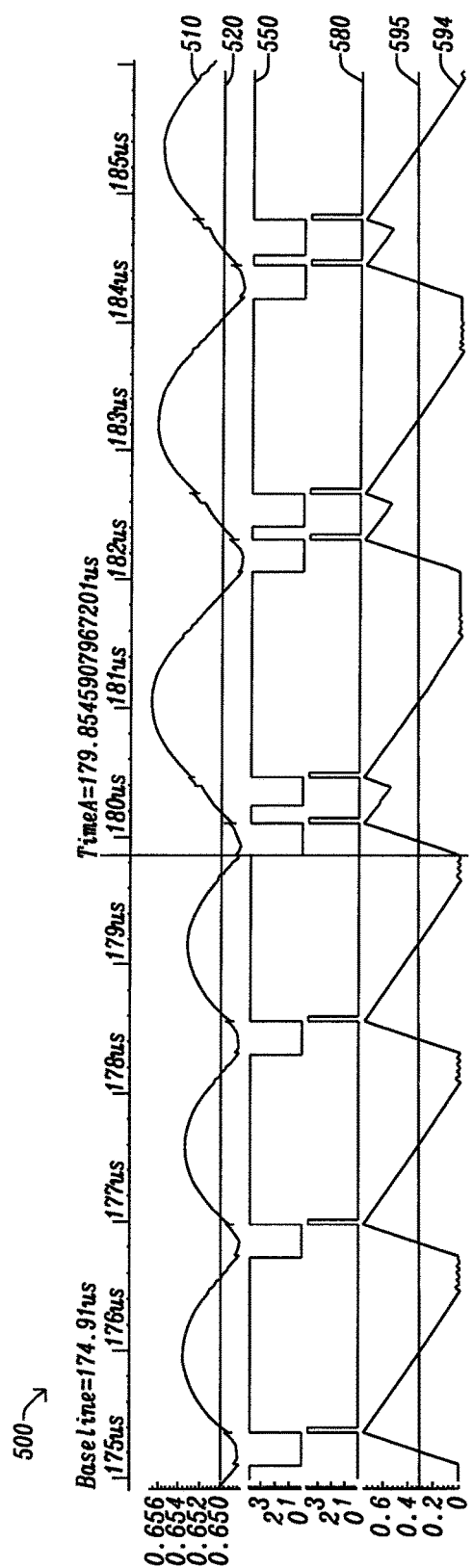
FIG. 5 illustrates when the pulse-frequency mode efficiency optimizer is not used, and the inductor has zero-current periods and starts bursting before reaching CCM, of the prior art.

FIG. 5 illustrates 500, when the pulse-frequency mode efficiency optimizer is not used, and the inductor has zero-current periods and starts bursting before reaching CCM, as seen in the prior art. Similar to FIG. 1, output voltage ripple Vout 510 is increased when bursting, compared to PFM reference voltage refSlp 520. The output of the under voltage comparator VoutOkSlp 550 is reset with rstSlp 580. The voltage comparator is blanked for a given fixed delay after the first current limit peak is achieved. While this is desirable for efficiency, it is a major drawback for fast load transient response, given the control logic is unable to ramp up load current ILoad 595 during the blanking. The inductor current is represented by signal ILx 594.

Figure 6:
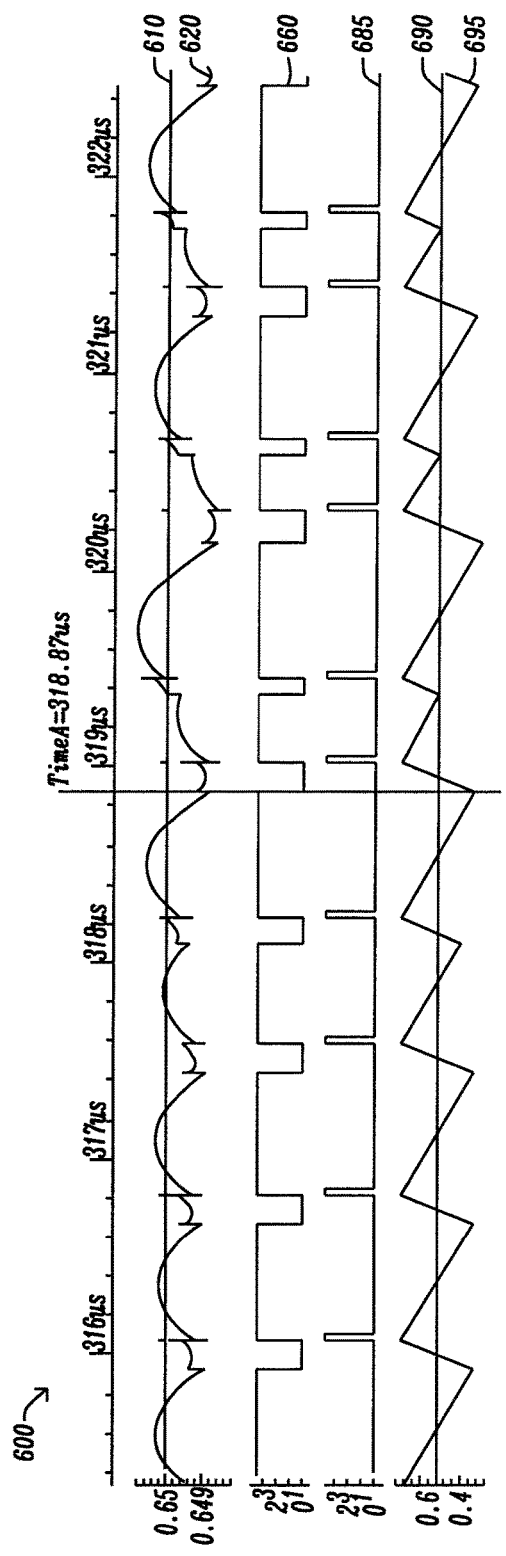
FIG. 6 shows when the pulse-frequency mode efficiency optimizer is used, and the inductor current starts bursting only after reaching CCM, embodying the principles of the disclosure.

FIG. 6 shows 600, when the pulse-frequency mode efficiency optimizer is used, and the inductor current starts bursting only after reaching CCM, embodying the principles of the disclosure. Output voltage ripple Vout 610 is shown increasing compared to PFM reference voltage refSlp 620, when bursting. With the addition of the modulation logic and delay generator, the output voltage and load current ILoad 695 are brought back into regulation when bursting occurs only at higher loads, as compared to the case of FIG. 5. The dynamic control of the reset duration of under voltage comparator output VoutOkSlp 660, triggered by rstSlp 685, provides pulse-frequency modulation efficiency for fast load transient response in the DC-DC switching converter. The inductor current is represented by signal ILx 690.

Figure 7:
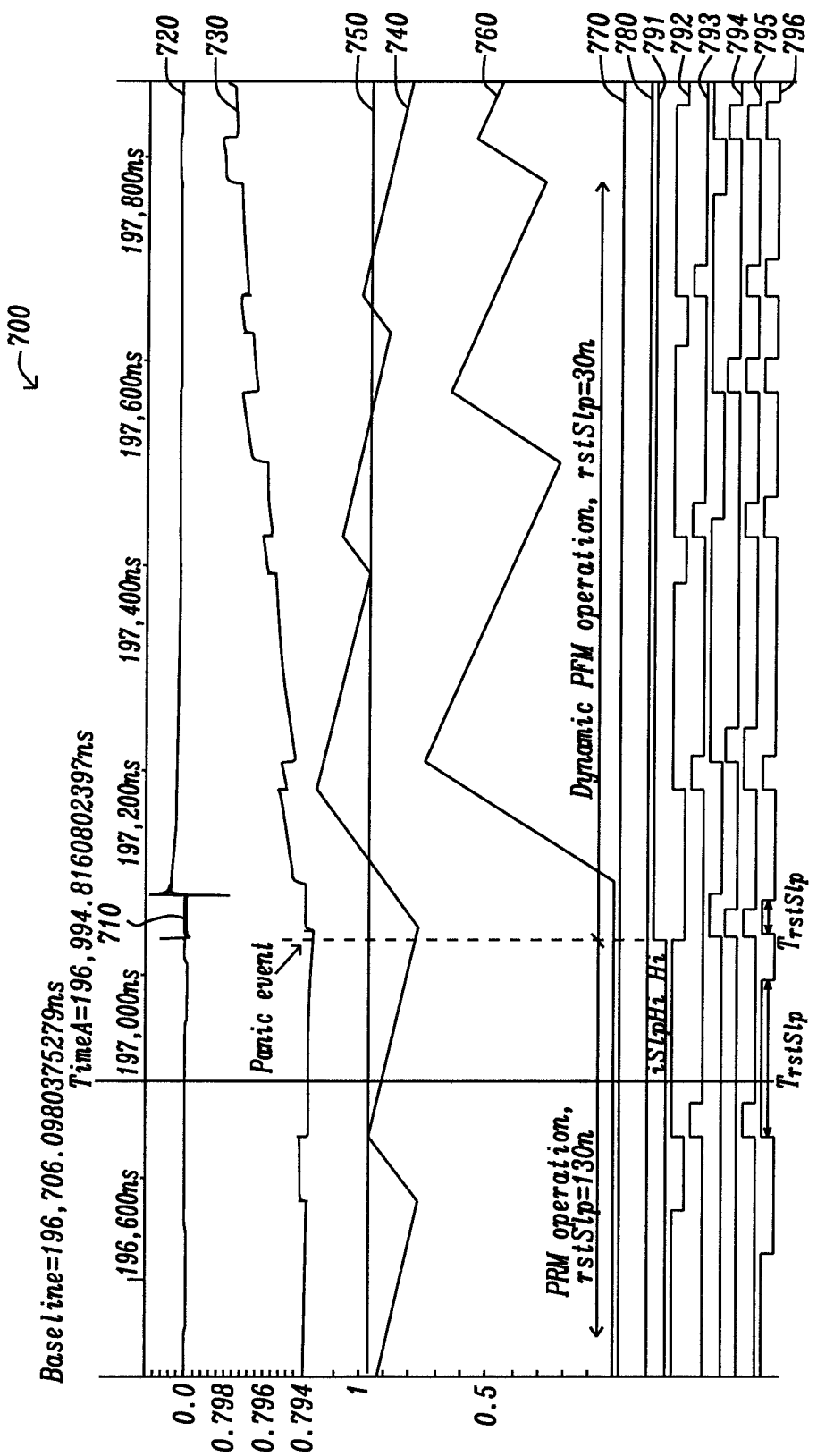
FIG. 7 presents the detailed simulation results of a dual phase Buck switching converter, during a PFM to dynamic PFM transition, embodying the principles of the disclosure.

FIG. 7 presents 700, the detailed simulation results of a dual phase Buck switching converter, during a PFM to dynamic PFM transition. When the applied load is beyond sleep mode capability, due to output voltage Vout 730 drop in comparison to reference voltage refSlp 720, iSlpHi 790 goes high triggering a panic condition. When the switching converter moves from PFM (phase 0 operating) to dynamic PFM operation (phase 0 and phase 1 operating), TrstSlp is significantly reduced. This allows for fast reaction time of the switching converter, and the interaction between phases through the under comparator reset logic is minimized.

The modulator logic and delay generator blank the under voltage comparator output for a longer period of time, 130 ns on rstSlpPh0 792 and rstSlp_m 796, when low current conditions exist in PFM operation. This allows more charge to be delivered across the output capacitor before latching the decision to turn the switching converter on again, in TslpMinOffPh0 791. This pushes the load bursting point sustained in PFM mode to higher currents, improving the power efficiency of the switching converter.

The modulator logic and delay generator blank the comparator for a shorter period of time, 30 ns on rstSlpPh0 792 and rstSlpPh1 794, in dynamic PFM operation. The under voltage comparator accepts the randomized sum of reset signals TslpMinOffPh0 791 and TslpMinOffPh1 793 in rstSlp_or 795, and generates dynamic comparator reset signal rstSlp_m 796, according to the load conditions.

The need for compatibility with four phase current DC-DC switching converter topologies is configured with two phases operating in PFM at light loads, to minimize interaction between the phases. The reset generated by one phase on rstSlp extends the off time of the other phase, minimizing the time allowed between the peak of the inductor current and the beginning of the next switching cycle on TslpMinOff.

For dynamic PFM operation, when an increased load is detected, the blanking time is reduced to a minimum, allowing for a fast reaction of the switching converter in returning load current IL0x 760 and IL1x 750 to regulation quickly. This can be seen on the right side of FIG. 7. The unfiltered reference voltage is represented by refSlp 710, and ILoad 740 represents the load current. The sleep mode indicator is 770, and 780 is the start mode indicator.

Figure 8A:
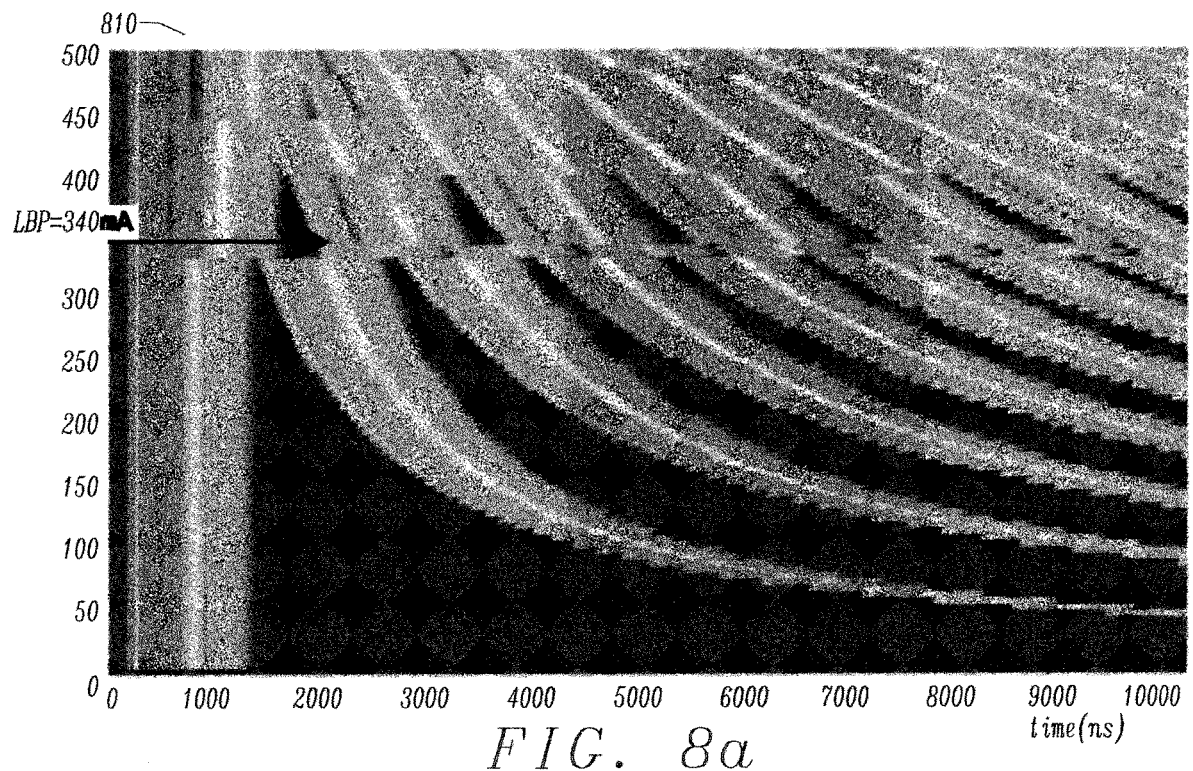
FIGS. 8a and 8b present the model results from a Buck switching converter inductor load current, with and without dynamic blanking of the under voltage comparator, embodying the principles of the disclosure.
Figure 8B:
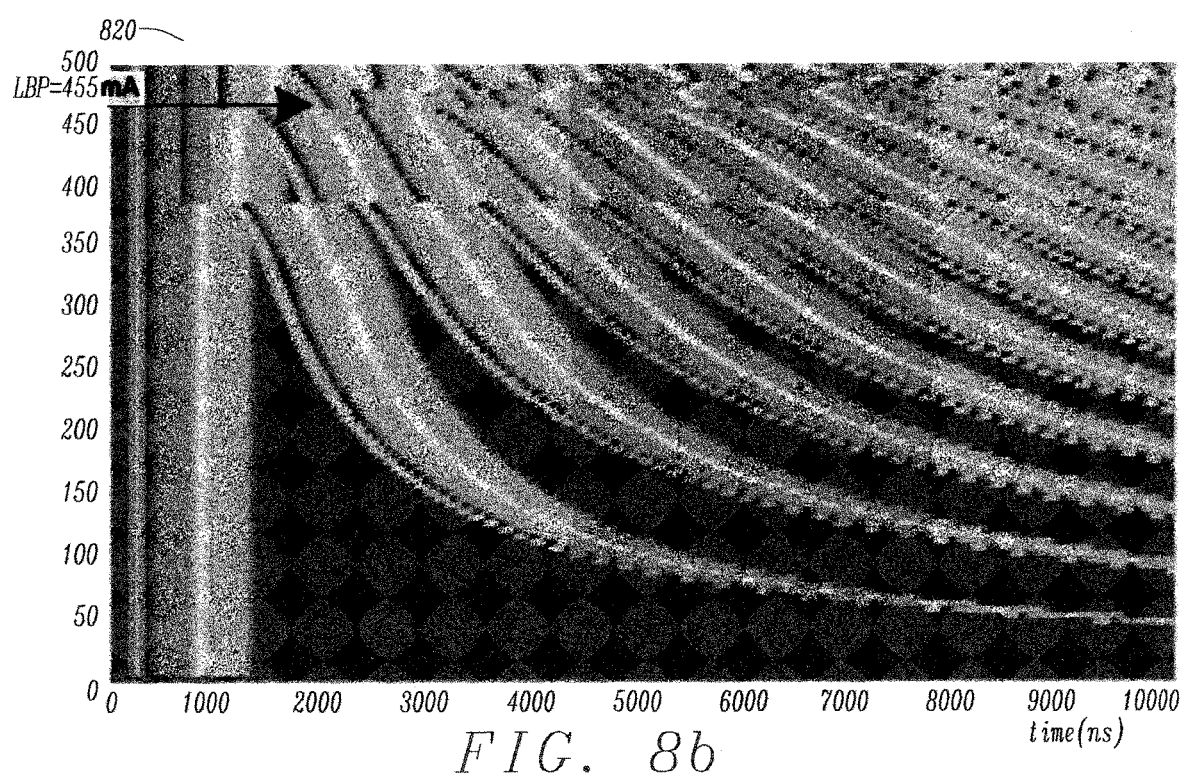

FIGS. 8a and 8b present the model results from a Buck switching converter inductor load current, with and without dynamic blanking of the under voltage comparator. The x-axis represents time and the y-axis represents increasing load current iLoad. The dark regions of the model present ILx(t)=0, while the grey regions of the model present ILx(t)=ILimit, where ILimit represents the peak current limit of the current-control mode DC-DC switching converter.

The switching converter is at the load bursting point (LBP) when two grey regions, or inductor current peaks, are adjacent. FIG. 8a 810 presents the case for no dynamic blanking, with bursting starting at a load current LBP=340 mA. FIG. 8b 820 presents the case for dynamic blanking, with bursting starting at a load current LBP=455 mA. FIG. 8 illustrates how pushing the load bursting point, sustained in PFM mode, to higher currents improves the power efficiency of the switching converter.

Figure 9:
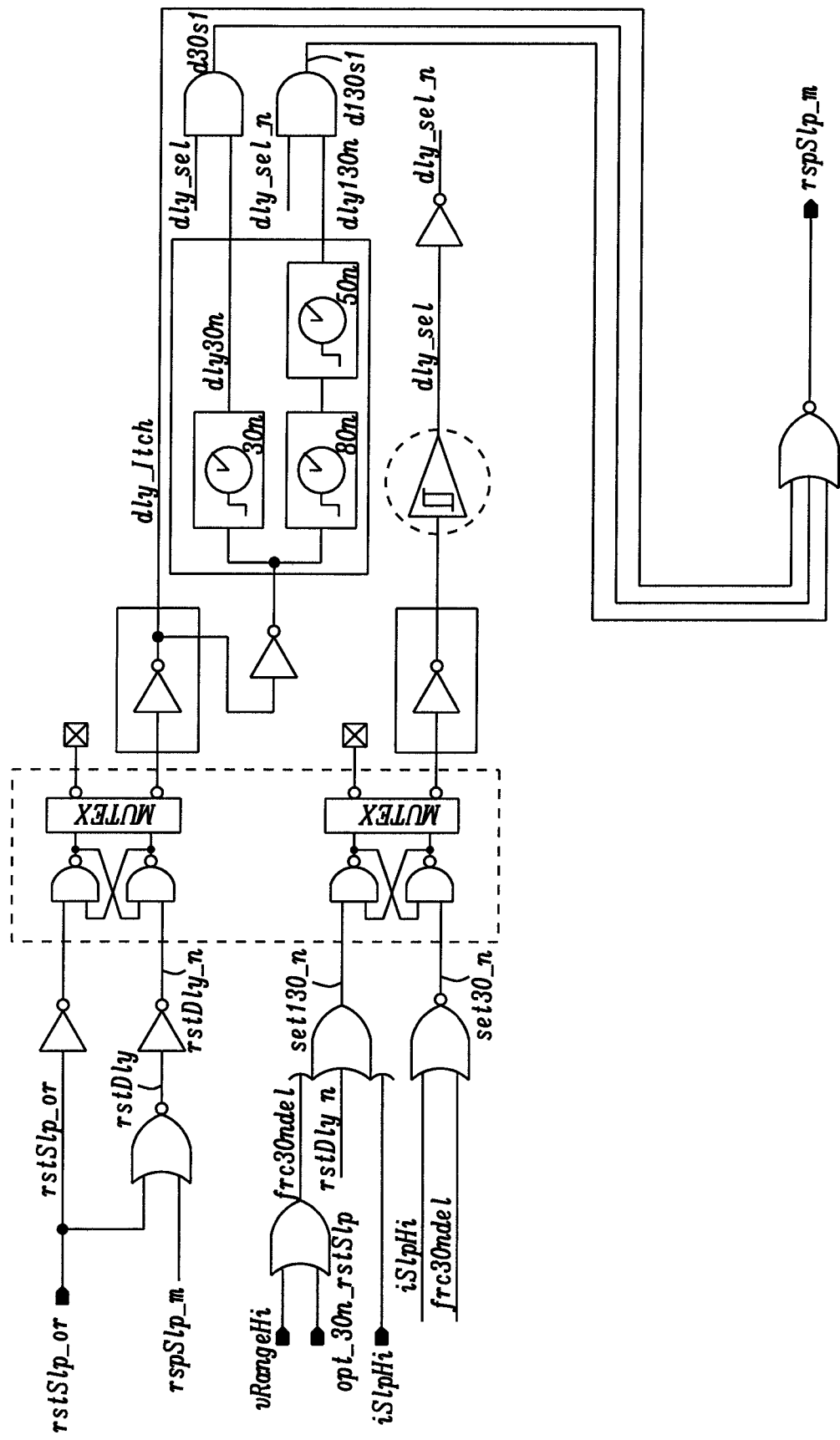
FIG. 9 represents a possible circuit implementation of the delay optimization described by the concept in FIG. 3.

FIG. 9 represents possible circuit implementation 900 of the delay optimization described by the concept in FIG. 3. The circuit receives the asynchronous inputs generated by the phases, and depending on the panic state condition, generates a longer or shorter reset delay pulse for dynamic blanking of the under voltage comparator. The other inputs represent static configurations for programmability.

The circuit accepts the randomized sum of the reset signals from each phase, combined into rstSlp_or, and generates under voltage comparator blanking on rstSlp_m depending on load conditions. Signal iSlpHi receives the asynchronous dynamic PFM assertion to dynamically select the rstSlp_m duration, and the circuit automatically synchronizes the change between blanking delays for a glitch free output.

Available inputs of the disclosed circuit allow compatibility from one to four phases in the switching converter. Signal rstSlp_or receives the or-ed asynchronous reset signals generated by all four phases, preventing a race condition when rstSlp_or falls, delaying the switching from 30 ns to 130 ns. Since the efficiency optimization is most significant at low output voltages, the input vRangeHi hard sets the 30 ns rstSlp_m. This turns off the dynamic blanking function, if the switching converter is regulating at high output voltages. Signal opt_30n_rstSlp allows optionally setting the 30 ns rstSlp_m signal independent of the voltage setting. The filters in the rectangular boxes represent MUTEX cells and the green clocks represent logic delay cells.

The table below presents the simulated efficiency results of a 1.5 A single phase Buck switching converter, operating in PFM mode, with a load current of 375 mA. The efficiency gains are shown to be most relevant when regulating at a low output voltage Vout, with under voltage comparator blanking times rstSlp_m 30 ns and 130 ns.

| η(%) | rstSlp_m = 30 ns | rstSlp_m = 130 ns | η gain (%) |
| --- | --- | --- | --- |
| Vout = 0.65 | 87.66 | 89.18 | 1.52 |
| Vout = 1.4 | 93.29 | 93.4 | 0.11 |

Figure 10:
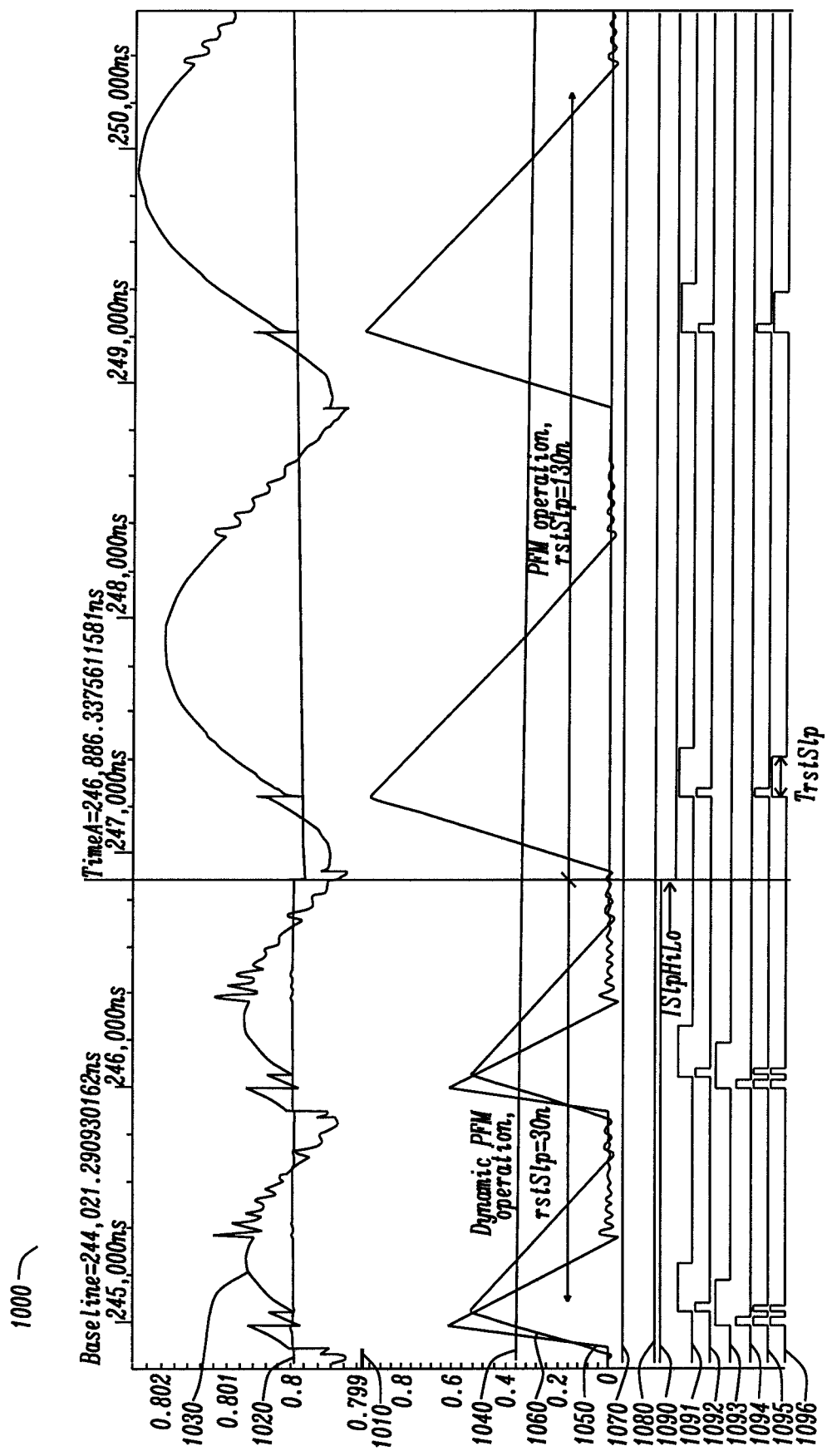
FIG. 10 illustrates the detailed simulation results of a dual phase Buck switching converter, during a dynamic PFM to PFM transition, embodying the principles of the disclosure.

FIG. 10 illustrates 1000, the detailed simulation results of a dual phase Buck switching converter, during a dynamic PFM to PFM transition. When the applied load returns to sleep mode capability, due to output voltage Vout 1030 rise in comparison to reference voltage refSlp 1020, iSlpHi 1090 goes low. When the switching converter moves from dynamic PFM operation (phase 0 and phase 1 operating), to PFM operation (phase 0 operating), the blanking time of the comparator increases, as seen on the dynamic comparator reset signal.

For a shorter blanking time of rstSlp=30 ns, when in dynamic PFM operation, an increased load denotes panic condition, seen on the left side of FIG. 10. The blanking time triggered by pulses rstSlpPh0 1092 and rstSlpPh1 1094 is reduced to the minimum. This allows for fast reaction of the switching converter, on TslpMinOffPh0 1091 and TslpMinOffPh1 1093, returning IL0x 1060 and IL1x 1050 to regulation more quickly. The under voltage comparator accepts the randomized sum of the reset signals from phases TslpMinOffPh0 1091 and TslpMinOffPh1 1093 in rstSlp_or 1095, and generates dynamic comparator reset on rstSlp_m 1096, depending on the load.

The modulator logic of the disclosure blanks the comparator for a longer period of time, 130 ns on rstSlpPh0 1092, when low current conditions exist in PFM operation seen on the right side of FIG. 10. This allows more charge to be delivered across the output capacitor before latching the decision to turn the switching converter on again, in TslpMinOffPh0 1091. This pushes the load bursting point sustained in PFM mode, to higher currents, improving the power efficiency of the switching converter. The unfiltered reference voltage is represented by refSlp 1010, and ILoad 1040 represents the load current. The sleep mode indicator is 1070, and 1080 is the start mode indicator.

When the dynamic reset time is implemented, the amount of delay controlling the under voltage comparator is dependent on the loading conditions. The reset time does not extend the off time of the high side switching device, when switching in PFM CCM mode, and the maximum switching frequency is not decreased. The logic delays the latching of the decision when switching is needed, in low power mode, avoiding unnecessary pulses and increasing power conversion efficiency. At higher loads, the comparator reset time is reduced, allowing for faster dynamic response time.

Figure 11:
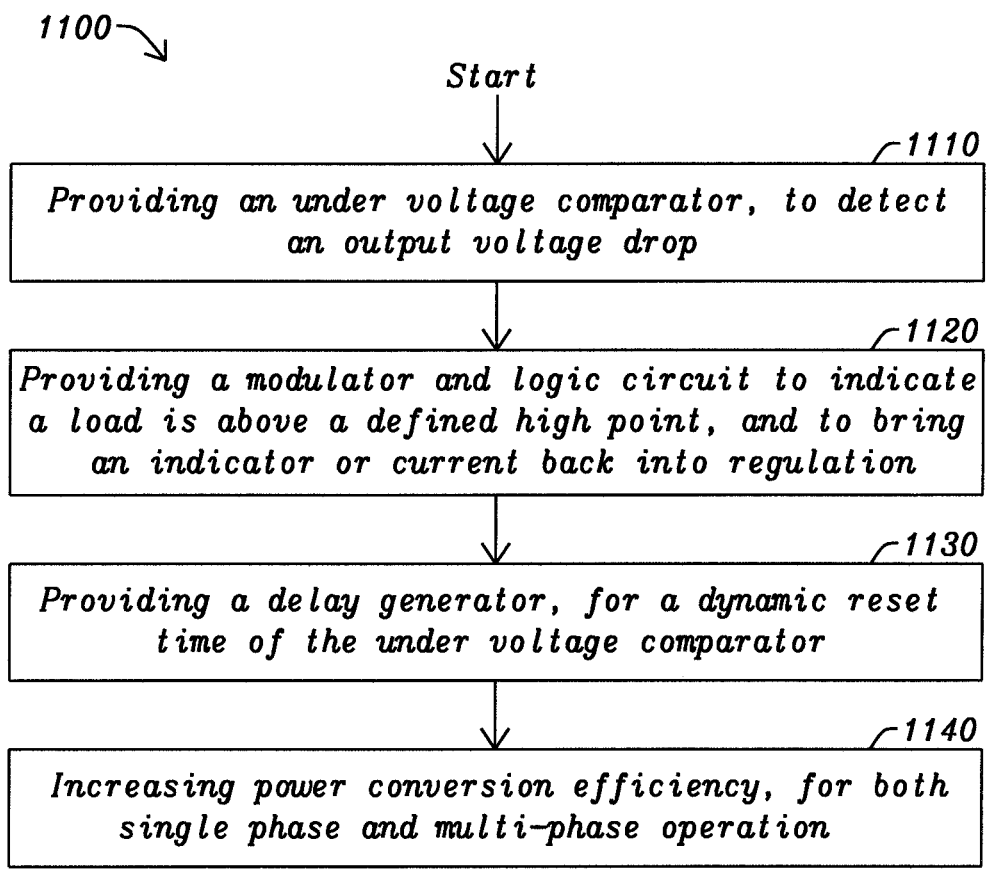
FIG. 11 is a flow chart of a method for pulse-frequency modulation efficiency optimization, for fast load transient response, in a current-control mode DC-DC switching converter, embodying the principles of the disclosure.

FIG. 11 is flow chart 1100, of a method for pulse-frequency modulation efficiency optimization, for fast load transient response, in a current-control mode DC-DC switching converter. The steps include 1110, providing an under voltage comparator, to detect an output voltage drop. The steps also include 1120, providing a modulator and logic circuit, to indicate a load is above a defined high point, and to bring an inductor current back into regulation. The steps include 1130, providing a delay generator, for a dynamic reset time of the under voltage comparator. The steps also include 1140, increasing power conversion efficiency, for both single phase and multi-phase operation.

The advantages of one or more embodiments of the present disclosure include achieving higher efficiency power conversion in a DC-DC switching converter, over a broad load range in pulse-frequency mode, while not adding delay to the transient response or restricting the maximum switching frequency. Additional advantages include significant efficiency optimization at low output voltages, and compatibility with multiphase architectures. The present disclosure also provides low complexity, with negligible silicon area and modular design. The logic can be easily configured according to different requirements, as well as easily disabled reverting to legacy operation of shorter blanking.

While this invention has been particularly shown and described with reference to the preferred embodiments thereof, it will be understood by those skilled in the art that various changes in form and details may be made without departing from the spirit and scope of the invention.

The invention claimed is:

1. A DC-DC current-control mode switching converter, comprising:
    an under voltage comparator, configured to detect an output voltage drop, wherein said under voltage comparator receives said switching converter output voltage on a non-inverting input, and a reference voltage on an inverting input;
    a modulator and logic circuit, configured to indicate a load is above a defined high point, and configured to bring an inductor current back into regulation;
    a delay generator, connected between said modulator and logic circuit and said under voltage comparator, wherein said delay generator is configured to receive a randomized sum of reset times from each phase of said switching converter, and to delay said under voltage comparator dependent on load conditions of said switching converter;
    wherein during a pulse-frequency modulation (PFM) mode and low loads, a first reset time is used, and during the PFM mode at higher loads, a second reset time is used, wherein said second reset time is less than said first reset time.

2. The switching converter of claim 1, wherein said under voltage comparator comprises an output configured to indicate sleep mode and an output configured to indicate when said switching converter is not in pulse-frequency mode.

3. The switching converter of claim 1, wherein inputs of said modulator and logic are connected to outputs of said under voltage comparator.

4. The switching converter of claim 1, wherein said modulator and logic comprises an output configured to reset a clock signal and an output configured to indicate said load is above said defined high point.

5. The switching converter of claim 1, wherein said delay generator is connected to outputs of said modulator and logic.

6. The switching converter of claim 1, wherein said modulator and logic circuit is configured to control a high side device and a low side device, through a high side driver and a low side driver.

7. The switching converter of claim 6, wherein said modulator and logic circuit is configured for a minimum delay to an off time of said high side device, when switching in pulse-frequency continuous conduction mode.

8. The switching converter of claim 6, wherein said high side device comprises a PMOS device.

9. The switching converter of claim 6, wherein said low side device comprises a NMOS device.

10. The switching converter of claim 1, wherein said delay generator is configured to delay said outputs of said under voltage comparator for a minimum time, when said load is high, to allow for a response.

11. The switching converter of claim 1, wherein when said switching converter is configured for low power sleep mode, said delay generator is configured to delay said outputs of said under voltage comparator for a delayed time, to increase a power conversion efficiency of said switching converter.

12. The switching converter of claim 1, wherein said switching converter comprises a Buck, Boost, or Buck-Boost DC-DC switching converter.

13. The switching converter of claim 1, wherein said switching converter comprises a multiphase DC-DC switching converter.

14. A method for pulse-frequency modulation efficiency optimization, for fast load transient response, in a current-control mode DC-DC switching converter, comprising the steps of:
    providing an under voltage comparator, wherein said under voltage comparator receives said switching converter output voltage on a non-inverting input, and a reference voltage on an inverting input, to detect an output voltage drop;
    providing a modulator and logic circuit, to indicate a load is above a defined high point, and to bring an inductor current back into regulation;
    providing a delay generator, to receive a randomized sum of reset times from each phase of said switching converter, and to delay said under voltage comparator dependent on load conditions of said switching converter,
    wherein during a pulse-frequency modulation (PFM) mode and low loads a first reset time is used, and during the PFM mode at higher loads a second reset time is used, wherein said second reset time is less than said first reset time; and increasing power conversion efficiency, for both single phase and multi-phase operation of said switching converter.

15. The method of claim 14, wherein said under voltage comparator indicates sleep mode, and when said switching converter is not in pulse-frequency mode.

16. The method of claim 14, wherein said modulator and logic resets a clock signal and indicates said load is above said defined high point.

17. The method of claim 14, wherein said modulator and logic control a high side device and a low side device, through a high side driver and a low side driver.

18. The method of claim 17, wherein said modulator and logic provide minimum delay to an off time of said high side device, when switching in pulse-frequency continuous conduction mode.

19. The method of claim 14, wherein said delay generator blanks said outputs of said under voltage comparator for a minimum time, when said load is high, to allow for a response.

20. The method of claim 14, wherein when said switching converter is in low power sleep mode, said delay generator delays said outputs of said under voltage comparator for a delayed time, to increase the power conversion efficiency of said switching converter.

* * * * *